Jan. 5, 1926.
1,568,674
T. B. KNOWLES
STEREOPTICON SLIDE
Filed Sept. 19, 1923
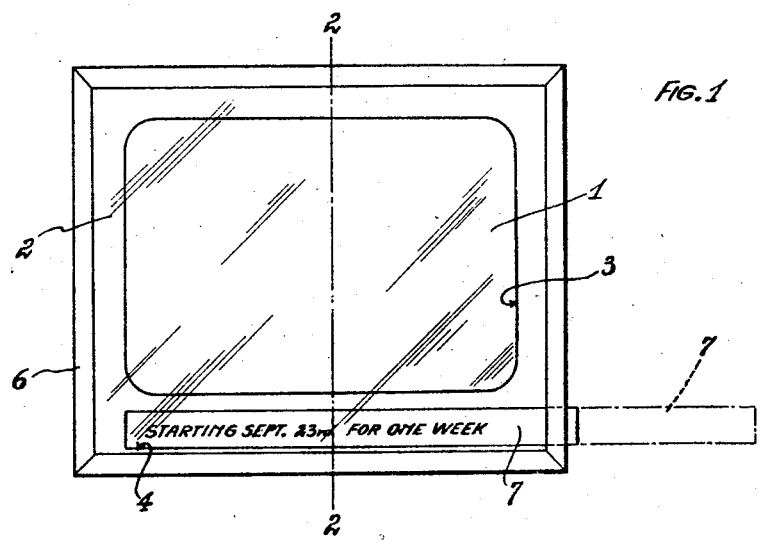
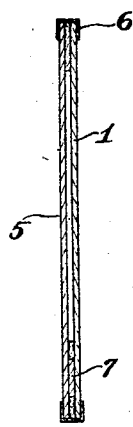
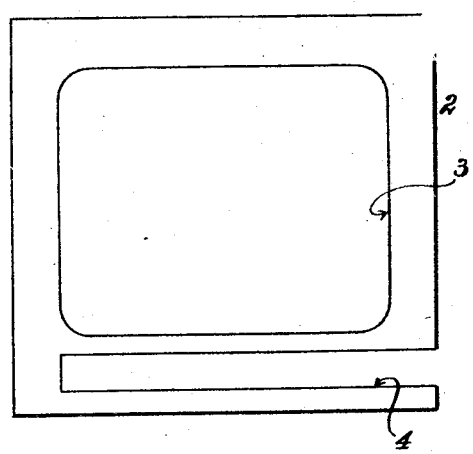
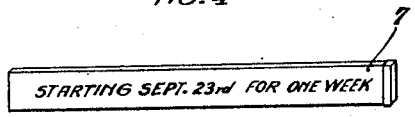
INVENTOR
THOMAS B. KNOWLES
BY
ATTORNEY Patented Jan. 5, 1926.

1,568,674

UNITED STATES PATENT OFFICE.

THOMAS B. KNOWLES, OF OAKLAND, CALIFORNIA.

STEREOPTICON SLIDE.

Application filed September 19, 1923. Serial No. 663,622.

*To all whom it may concern:*

Be it known that THOMAS B. KNOWLES, a citizen of the United States, residing at Oakland, in the county of Alameda and State of California, has invented certain new and useful Improvements in Stereopticon Slides, of which the following is a specification.

My invention is an improved stereopticon slide.

In advertising pictures which are to appear at a future date in a moving picture theater, it is the custom to place slides in the projector which show various scenes from the play, and under the pictures appears the date, or days of the week on which the picture is to be played.

It is now customary for the operator to write or print as best he can this information upon the bottom of the slide. Naturally, since the operator is not an artist his efforts are usually quite crude and detract materially from the picture as shown on the screen.

The object of my invention is to provide a stereopticon slide in which an auxiliary slide is placed, upon which is placed the desired information or advertising matter on the picture as shown.

A further object of my invention is to provide a slide which is artistic and labor saving. By the present method, the dates and so forth are printed on the slide in ink and the constant handling makes them quite dirty, which naturally appears on the screen and makes an unsightly appearance. This will be entirely eliminated with my improved slide.

Further objects and advantages will be more particularly pointed out and described in the following detailed description.

In the annexed drawing in which my invention is illustrated, I have shown the preferred form, but it may also be embodied in other forms, and in this application I desire to cover my invention in whatever form it may be embodied.

Figure 1 is a face view of my improved slide.

Figure 2 is a sectional view taken on the line 2—2 of Figure 1.

Figure 3 is a face view of the mat.

Figure 4 is a side view of the auxiliary slide.

Referring more particularly to the drawing, the numeral 1 indicates a stereopticon slide upon which appear certain pictures or advertisements. A mat 2 is placed upon the slide 1, which mat has an opening 3 formed therein through which the picture appears; a slot 4 is preferably formed in the lower part of the mat 2, the object of which will be more fully described. A plain glass 5 is placed over the mat 2 and a suitable binding tape 6 is placed around the edges of the slide 1 and glass to hold them together. An auxiliary slide 7 upon which appears the date or other advertising matter on the picture in the slide, and which slide is adapted to be positioned in the slide 4 and between the slide 1 and glass 5. The date or other advertising matter is artistically printed, lithographed or suitably placed upon the slide 7 so as to give a very pleasing appearance. The mat 2 is preferably a little wider than the slide 1 and plate 5 so that the slide 7 extends to the outer edge thereof, thus affording a convenient hold to withdraw it from the slot 4. It is readily seen that the slide 7 may be positioned either at the sides or at the top of the slide 1, as may be desired.

Having described my invention I claim:

An improved stereopticon slide comprising a picture slide, a mat placed over said slide having an opening therein for the picture, a piece of glass placed over said mat and an auxiliary slide adapted to be inserted within a slot in the mat and between the picture slide and the glass.

In testimony whereof I affix my signature.

THOMAS B. KNOWLES.